(12) United States Patent
Dennis et al.

(10) Patent No.: US 7,174,446 B2
(45) Date of Patent: Feb. 6, 2007

(54) SYSTEM AND METHOD FOR MANAGING THE BOOT SEQUENCE OF AN INFORMATION HANDLING SYSTEM

(75) Inventors: Lowell B. Dennis, Pflugerville, TX (US); Peter A. Woytovech, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 10/424,131

(22) Filed: Apr. 25, 2003

(65) Prior Publication Data

US 2004/0215949 A1 Oct. 28, 2004

(51) Int. Cl.
*G06F 15/177* (2006.01)

(52) U.S. Cl. .......................... 713/1; 713/100

(58) Field of Classification Search .............. 713/1, 713/2, 100
See application file for complete search history.

(56) References Cited

U.S. PATENT DOCUMENTS

| | | | | |
|---|---|---|---|---|
| 5,274,816 A * | 12/1993 | Oka | .............................. | 713/2 |
| 5,361,358 A * | 11/1994 | Cox et al. | .................... | 717/174 |
| 5,546,553 A | 8/1996 | Robertson et al. | .......... | 395/405 |
| 5,579,522 A | 11/1996 | Christeson et al. | ......... | 395/652 |
| 5,636,335 A | 6/1997 | Robertson et al. | .......... | 395/131 |
| 5,696,923 A | 12/1997 | Robertson et al. | .......... | 395/412 |
| 5,696,924 A | 12/1997 | Robertson et al. | .......... | 395/412 |
| 5,696,968 A * | 12/1997 | Merkin | .......................... | 713/2 |
| 5,854,905 A | 12/1998 | Garney | ....................... | 395/284 |
| 5,867,106 A | 2/1999 | Bi et al. | ........................ | 340/825.31 |
| 5,875,293 A | 2/1999 | Bell et al. | ............... | 395/183.03 |
| 5,884,073 A | 3/1999 | Dent | ............................ | 395/652 |
| 5,974,558 A | 10/1999 | Cortopassi et al. | ......... | 713/323 |
| 5,990,875 A | 11/1999 | Bi et al. | ...................... | 345/179 |
| 5,996,082 A | 11/1999 | Cortopassi | ................... | 713/321 |
| 6,005,533 A | 12/1999 | Wilson | .......................... | 345/2 |
| 6,018,806 A | 1/2000 | Cortopassi et al. | ............ | 714/8 |
| 6,092,117 A | 7/2000 | Gladwin et al. | ............ | 709/239 |
| 6,105,130 A * | 8/2000 | Wu et al. | ....................... | 713/2 |
| 6,108,727 A | 8/2000 | Boals et al. | ................... | 710/68 |
| 6,126,327 A | 10/2000 | Bi et al. | ................. | 395/200.51 |
| 6,137,473 A | 10/2000 | Cortopassi et al. | ......... | 345/156 |
| 6,141,688 A | 10/2000 | Bi | .............................. | 709/227 |
| 6,148,344 A | 11/2000 | Bi | .............................. | 709/250 |
| 6,154,824 A | 11/2000 | Robertson et al. | .......... | 711/202 |
| 6,189,077 B1 | 2/2001 | Robertson et al. | .......... | 711/149 |
| 6,205,548 B1 | 3/2001 | Hasburn | ......................... | 713/2 |
| 6,209,034 B1 | 3/2001 | Gladwin et al. | ............ | 709/227 |
| 6,262,719 B1 | 7/2001 | Bi et al. | ..................... | 345/179 |
| 6,279,153 B1 | 8/2001 | Bi et al. | ....................... | 717/11 |
| 6,282,641 B1 * | 8/2001 | Christensen | .................... | 713/2 |

(Continued)

OTHER PUBLICATIONS

"BIOS Boot Specification," Version 1.01, Compaq Computer Corporation, Phoenix Technologies Ltd. and Intel Corporation (46 pages), Jan. 11, 1996.

*Primary Examiner*—Chun Cao
(74) *Attorney, Agent, or Firm*—Baker Botts L.L.P.

(57) ABSTRACT

A method and system for maintaining a boot sequence in bootable devices is disclosed. The method includes receiving a bootable device configuration for one or more bootable devices in an information handling system, comparing the bootable device configuration to a configuration history of one or more bootable devices; and updating the configuration history.

23 Claims, 4 Drawing Sheets

U.S. PATENT DOCUMENTS

| | | | |
|---|---|---|---|
| 6,292,890 B1 | 9/2001 | Crisan | 713/2 |
| 6,330,231 B1 | 12/2001 | Bi | 370/328 |
| 6,353,599 B1 | 3/2002 | Bi et al. | 370/328 |
| 6,353,885 B1 | 3/2002 | Herzi et al. | 713/1 |
| 6,356,965 B1 | 3/2002 | Broyles et al. | 710/104 |
| 6,401,140 B1 | 6/2002 | Wu | 710/10 |
| 6,446,213 B1 | 9/2002 | Yamaki | 713/300 |
| 6,513,114 B1 * | 1/2003 | Wu et al. | 713/2 |
| 6,721,883 B1 * | 4/2004 | Khatri et al. | 713/2 |
| 6,754,817 B2 * | 6/2004 | Khatri et al. | 713/1 |
| 6,754,818 B1 * | 6/2004 | Lee et al. | 713/2 |
| 6,785,838 B2 * | 8/2004 | Lim et al. | 714/7 |
| 6,925,557 B2 * | 8/2005 | Cromer et al. | 713/2 |
| 2003/0233535 A1 * | 12/2003 | Nunn et al. | 713/1 |

* cited by examiner

A

BCV Table

| 0 | Hard Drive 1 |
|---|---|
| 1 | Hard Drive 1 |

B

IPL Table

| 0 | Floppy A: |
|---|---|
| 1 | Hard Drive C: |
| 2 | CD-ROM |
| 3 | NIC |

C

Bios BBS Implementation

| Device | Type | Address | Discriminator |
|---|---|---|---|
| 0 | Hard Drive | YYYYYYY | B |
| 1 | Hard Drive | ZZZZZZZZ | E |

D

Bios BBS Implementation

| Device | Type | Address | Discriminator |
|---|---|---|---|
| 0 | Floppy Drive | AAAAAAAA | A |
| 1 | Hard Drive | CCCCCCCC | B |
| 2 | CD-ROM | XXXXXXXX | C |
| 3 | NIC | BBBBBBBB | D |

FIGURE 2

BCV Table

A

| 0 | Hard Drive |
|---|---|
| 1 | Hard Drive |
| 2 | Hard Drive |

IPL Table

B

| 0 | Floppy A: |
|---|---|
| 1 | Hard Drive C: |
| 2 | CD-ROM |
| 3 | NIC |

Bios BBS Implementation

C

| Device | Type | Address | Discriminator |
|---|---|---|---|
| 0 | Hard Drive | XXXXXXXX | B |
| 1 | Hard Drive | YYYYYYYY | E |
| 2 | Hard Drive | ZZZZZZZZ | G |

D

| Device | Type | Address | Discriminator |
|---|---|---|---|
| 0 | Floppy Drive | AAAAAAAA | A |
| 1 | Hard Drive | CCCCCCCC | B |
| 2 | CD-ROM Drive | Dormant | C |
| 3 | NIC | BBBBBBBB | D |

FIGURE 3

SYSTEM AND METHOD FOR MANAGING THE BOOT SEQUENCE OF AN INFORMATION HANDLING SYSTEM

FIELD OF THE INVENTION

This invention relates, in general, to information handling systems, and, more particularly, to an information handling system that may discriminate between bootable devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a Basic Input/Output System (BIOS) firmware as part of a system motherboard. Among other things, the BIOS detects bootable devices that are included in an information handling system. One of the steps of the BIOS's power on system test (POST) is to detect and initialize bootable devices. The BIOS also loads an operating system (O/S) on the information handling system. The order of devices for which the BIOS attempts to load an O/S may be determined by the user or be a default setting of the computer.

Bootable devices may be added to or removed from an information handling system. The boot sequence of bootable devices following a POST may be determined, based in part, on how the BIOS identifies and handles a newly added component. For example, if a bootable device is added to an information handling system, the BIOS may place that newly added device at the end of the boot sequence. Additionally, if a newly added device replaces a previously detected bootable device, then the BIOS may add that newly added device to the end of the boot sequence. In this case, although the added device replaced an existing device, the boot sequence for the information handling system changed following the addition of the new device. As a consequence, a user would have to manually modify the boot sequence to restore the boot sequence to that order before the next boot.

SUMMARY OF THE INVENTION

In accordance with the present disclosure, one implementation of a method for maintaining a boot sequence in an information handling system includes receiving a current configuration for one or more bootable devices in an information handling system. The current configuration may include a second list, and each element of the second list may include a bootable device type and a bootable device discriminator. A bootable device discriminator may uniquely identify a bootable device having a bootable device type. The method also includes comparing the current configuration to a previous configuration of one or more bootable devices, and updating the configuration history.

One technical advantage of a method to, maintain the boot sequence of bootable devices is that the BIOS can automatically determine a boot sequence that is similar to the boot sequence that existed previously.

Another technical advantage of a method to maintain the boot sequence of bootable devices is that the boot sequence of a device that replaces an existing device in an information handling system will be unchanged.

Another technical advantage of a method to maintain the boot sequence of bootable devices is that the removal of a bootable device may create a dormant device in the information handling system. During a POST, the BIOS may skip a dormant device, and thus the boot sequence of the remaining bootable devices will be unaffected.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2A is one example BCV table;

FIG. 2B is one example IPL Table;

FIG. 2C is one example of information about BCV devices stored by the BIOS;

FIG. 2D is one example of information about IPL devices stored by the BIOS;

FIG. 3A is one example BCV table;

FIG. 3B is one example IPL Table;

FIG. 3C is one example of information about BCV devices stored by the BIOS;

FIG. 3D is one example of information about IPL devices stored by the BIOS; and

DETAILED DESCRIPTION OF THE PREFERRED EMBODIMENTS

When a computer system is turned on (or reset), the BIOS typically performs a power on system test (POST). During the POST the BIOS identifies the bootable devices in the computer system. If bootable devices have been added to a computer system, the BIOS may determine the boot sequence of the new devices.

Computer systems typically store information about bootable devices so that, among other things, the Basic Input/Output System (BIOS) can load the operating system (O/S). The boot sequence of bootable devices may be established by a user's preference, or if no user preference exists, then by a default boot order. For example, the default setting of a computer comprising a floppy drive, a hard drive, and a CD-ROM drive may be chosen so that the BIOS first attempts to boot from the floppy drive A, if that fails, from the CD-ROM Drive, if that fails from the Hard Drive C. Failing an O/S boot from hard drive C, an error message may be displayed indicating an O/S boot failure.

Some BIOS versions store information about the device type and corresponding address associated with a bootable device. If, for example, during a boot sequence, the BIOS recognizes that the address associated with a bootable device changes from its previous address, the BIOS may identify the corresponding bootable device as a new device. The BIOS may then place that bootable device in at the end of the boot sequence, and consequently change the boot sequence of a computer system. By storing a device discriminator that uniquely identifies a bootable device, a change in the address associated with the bootable device may not cause the BIOS to recognize the bootable device as a new device.

Figure 1:
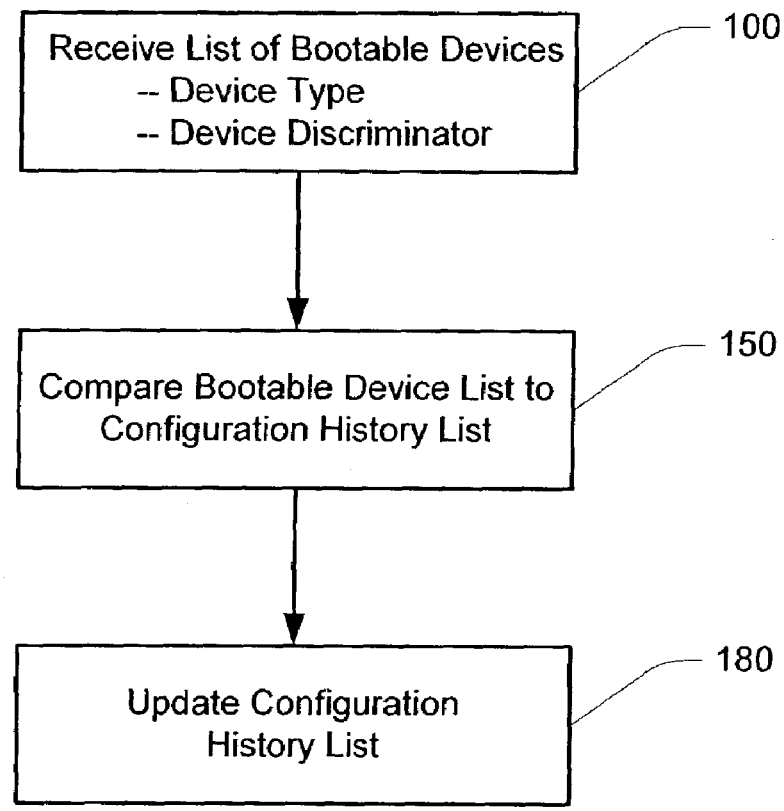
FIG. 1 is one example of a method for maintaining the boot sequence of bootable devices in an information handling system.

One example of a method for discriminating among bootable devices in an information handling system is shown in FIG. 1. The method consists of three steps. First, a list of bootable devices is received a block 100. The list typically includes a device type and device discriminator. Next, the bootable device list is compared to one or more configuration history lists (block 150). Finally, the one or more configuration history lists are updated at block 180.

Some BIOS implementations store bootable device information in one or more tables (or files). In an example system, one table may store information related to hard disk drives (or devices that appear to the BIOS as a hard disk drive), and another table may store information related to all other bootable devices and hard disk drive C. One such table is an initial program load (IPL) table. An IPL table typically stores information related to one or more IPL devices. An IPL device capable of loading and executing an O/S. Representative IPL devices include floppy disk drives, hard drives, CD-ROM and DVD Drives, PCMCIA controllers and cards, plug and play (PnP) cards, and legacy cards. With respect to hard drives, an IPL table typically contains only one entry that corresponds to a hard disk drive. In alternative example systems, the information related to bootable devices may be stored in a single table or in three or more tables. In still another alternative system, more than one entry in an IPL table may contain an entry for a hard drive.

Besides information about IPL devices, information related to hard disk drives may be stored in computer memory. In one example system, hard disk drive information may be stored in a boot connection vector (BCV) table. A BCV table contains a list of hard drives (or a list of devices that appear as a hard drive to the BIOS). If a user selects an order of hard drive devices in the BCV table, the first hard disk drive chosen by the user becomes drive C. In one example, the IPL table does not directly contain a BCV entry, but rather contains an entry that when invoked processes the BCV table. If no hard drive selection is made by the user, one hard drive is defaulted to drive C based upon a default computer configuration.

One implementation of a method to discriminate between bootable devices is shown in FIGS. 2 and 3 for a computer system having a multi-device small computer systems interface (SCSI) card. Consistent with FIG. 2A, the computer upon which FIG. 2 is based includes a floppy drive A and a multi-device SCSI card having a SCSI CD-ROM and two SCSI hard drives. In one example BIOS BBS implementation, the corresponding BCV table is shown in FIG. 2A. In this figure hard disk drive 1 corresponds to device 0 and hard disk drive 2 correspond to device 1. In one example computer system, device 0 of the BCV table identifies the hard disk drive that corresponds to hard drive C. In an alternative example, the user selects an order of hard drives, and the first hard drive selected by the user corresponds to hard drive C. Regardless of how chosen, the IPL table contains an entry that when invoked processes the BCV table.

The corresponding IPL table for the example computer system of FIG. 2 is shown in FIG. 2B. This example IPL table includes four entries: floppy drive A, hard drive C, a CD-ROM, and a network interface card (NIC), corresponding to devices 0, 1, 2, and 3, respectively. The entry for hard drive C in the IPL table of FIG. 2B is an entry that when invoked processes the BCV table. The IPL table shown in FIG. 2B includes the bootable devices that are checked by the BIOS during a power on system test (POST). The boot order of these devices may be selected by a user during a setup routine. In one example, the user selects the following boot order for the devices given in the IPL table of FIG. 2B: hard drive C, NIC, CD-ROM, and floppy drive A. The BIOS creates a priority list based upon the user's input.

Bootable devices may be replaced, removed, or added to a computer or information handling system. From a user's perspective, the replacement, removal, or addition of bootable devices should occur with minimal effect on the boot sequence of bootable devices. For example, if a bootable device is removed from a computer system, the boot order should remain unaffected, e.g., the BIOS would skip the bootable device that has been removed, and the next device in the sequence list would be booted. In this fashion, the devices that remain in the computer should retain their position in the boot sequence.

Alternatively, if a bootable device is added to the list without affecting any other devices, the additional device should be added to the end of the boot list. The devices that are not new (e.g., devices were part of the computer during the previous boot cycle) may retain their position and state in the boot sequence with any new devices being placed at the end of the boot sequence. One such example is the addition of a network card to a computer that previously lacked a network card.

In still another example, if a bootable device that was previously removed from the computer system is reinstalled, the reinstalled device may regain its position and state in the boot sequence existing before the removal. For example, following a reinstallation of a device, the bootable devices should regain its position and state that existed before its removal. In one example system, a dormant device is a device that is not found in the system, whereas a disabled device may be present. By disabling a device, the user can select which devices are allowed to boot the system, and which are not. In one example system, the floppy drive may be disabled to boot the system to a hard drive that may be password protected. While a disabled device cannot be booted, it still exists and can be used as normal after booting. Assuming that the CD-ROM shown in FIG. 2B is removed and then reinstalled, the boot order of the CD-ROM should be unchanged from the previous boot order of the CD-ROM Drive.

Finally if one or more devices of a boot sequence contain a dormant device, and if a device of similar type to the dormant device is added to the computer system, the new device may assume the position in the boot sequence of the dormant device without affecting any of the other devices. In one example system, the NIC card in a computer system was upgraded to a more advanced NIC card. In this case, the upgraded NIC card should assume the previous NIC card's position in the boot sequence. From the user's standpoint, only the NIC card itself, but not the boot order of the NIC card, would change. Therefore, the boot order of similar devices may be maintained when devices of similar type are added or removed from the computer system.

Similar devices may be identified by a unique identifier called a discriminator. A discriminator may be chosen to be any identifier that uniquely identifies devices within a class of device types. In the case of NIC cards, for example, the discriminator may be chosen to be a media access control (MAC) address. Other discriminators may be, for example, the contents of an address or range of addresses, the checksum of an address or range of addresses, or a cyclic redundancy check (CRC) of an address or range of addresses. In another example, the discriminator may identify a device. For example, a serial number for a device may be chosen as the discriminator. In an alternative example, the discriminator may be a pointer used by the system BIOS to identify the device. The discriminators themselves need not be unique across device types. For example, the same a hard disk drive and a CD-ROM may use the same discriminator. The uniqueness may be defined by the combination of a device type and the discriminator.

In still another example, the discriminator may include one or more parameters. The one or more parameters may be stored in memory. Example parameters include a MAC, the contents of an address or range of addresses, the checksum of an address or range of addresses, a cyclic redundancy check (CRC) of an address or range of addresses, or a serial number for a device may be chosen as the discriminator. The one or more parameters should unique identify devices having the same device types.

By storing a discriminator that can discriminate between devices with similar types, the substitution, addition, and deletion of bootable devices should not greatly affect the boot sequence of the devices of a computer system. In one implementation shown in FIG. 2, the hard disk data stored by the BIOS may include the data shown in FIG. 2C. As shown in FIG. 2C, the BIOS may store information corresponding to the device type, device address, and discriminator for each bootable device in the BCV table (e.g., for each hard disk drive). The type identifies what type of device is located in the IPL table as shown in FIG. 2B. Four different devices are shown: floppy Drive, hard drive, CD ROM and a NIC. The column labeled "Address" identifies the address in the system ROM that the bios can read and then identify as the device. Finally, the discriminator is a value that is stored in the system memory to discriminate between device types. For example, a given bard drive could be identified via a unique discriminator. Likewise a floppy drive could be identified by a unique discriminator. The discriminators themselves need not be unique. The uniqueness, however, is defined by the combination of the device type and the discriminator. Here, device 0 is a hard drive that is referenced by the BIOS at address YYYYYYYY and includes discriminator B, and device 1 is a hard drive that is referenced by the BIOS at address ZZZZZZZZ and includes discriminator E.

Additionally, as shown in FIG. 2D, the BIOS may store information corresponding to each bootable device in the IPL table. Here, device 0 is a floppy drive that is referenced by the BIOS at address AAAAAAAA and includes discriminator A. Device 1 is a hard drive that is referenced by the BIOS when the BIOS processes the entry located at address CCCCCCCC. Device 2 is a CD-ROM that is referenced by the BIOS at address XXXXXXXX and includes discriminator C. Finally, device 3 is a NIC that is referenced by the BIOS at address BBBBBBBB and includes discriminator D. The combination of the device type and a discriminator creates a unique device label such that when a user substitutes or removes or modifies a bootable device, the boot order is not affected.

One example of a change in bootable devices is shown in FIG. 3. Here the configuration of the computer of FIG. 3 has been changed from that of FIG. 2: a hard drive has been added to, and the CD-ROM has been removed from the SCSI card of the computer system. The BCV table shown in FIG. 3A includes three hard drive entries: device 0, device 1, and device 2. The hard drives labeled device 0 and device 1 were included in the prior system, and device 2 is a newly added hard drive. Moreover, the IPL table shown in FIG. 3B includes 4 entries: floppy drive A, hard drive C, CD-ROM, and a NIC. In the example shown in FIG. 3B, although the NIC was removed from the computer system, the entry corresponding to the NIC in the IPL table was not removed. By maintaining an element corresponding to the removed CD-ROM in the IPL table, a CD-ROM added to the system in the future could assume the boot order of the removed CD-ROM.

As shown in FIG. 3C, the BIOS stores information relating to the hard disk drives. Here, device 0 is a hard drive that is referenced by the BIOS at address XXXXXXXX and includes discriminator B. Device 1 is a hard drive that is referenced by the BIOS at address YYYYYYYY and includes discriminator E. Finally, device 2 is a hard drive referenced by the BIOS at address ZZZZZZZZ and includes discriminator G. In the example shown in FIG. 3B, the newly added hard drive is placed at the end of the BCV table and corresponds to device 2.

The BIOS also stores information relating to the devices in the IPL table as shown in FIG. 3D. Here, device 0 is a floppy drive that is referenced by the BIOS at address AAAAAAAA and includes discriminator A. Device 1 is the hard drive C that is referenced by the BIOS invokes the process at address CCCCCCCC. Device 2 corresponds to the CD-ROM that has been removed. As a result, the CD-ROM is a dormant device having an inactive status. Finally, device 3 is a NIC that is referenced by the BIOS at address BBBBBBBB and includes discriminator D.

Absent the discriminator B, a BIOS that identifies a device type and address would detect a change in address associated with the hard drive from FIG. 2C to FIG. 3C. Here the address of device 0 in the BCV table changed from XXXXXXXX to YYYYYYYY. As a result, absent a discriminator, when the BIOS processes the list of bootable devices, the BIOS may detect the hard drive with address XXXXXXXX in FIG. 3C as a new device. Furthermore, absent a discriminator, the BIOS may detect the hard drive with address YYYYYYYY as device 0 because its address and device type match that of device 0 of FIG. 2C. As a result, the removal of the CD-ROM drive from the SCSI card of the computer system of FIG. 2 may reverse the identity of the hard drives that computer system and resulting in a swapping of the boot sequence of the two hard drives.

As shown in FIGS. 3C and 3D, the inclusion of a discriminator may reduce the sensitivity of the boot sequence to changes in bootable device configuration. The device type (hard drive) and discriminator (B) of the hard drive with address XXXXXXXX in FIG. 3C matches the device type (Hard Drive) and discriminator (B) of the hard drive with address YYYYYYYY in FIG. 2C. The BIOS should, therefore, recognize that hard drive as an existing hard drive of the computer system. When the BIOS processes the list of bootable devices, the BIOS would compare both the device type and device discriminator to determine whether a new device has been added to a computer system. As illustrated in FIG. 3C, removing the CD-ROM drive from the computer system changes the address of the hard drive with discriminator B, but does not change the boot sequence. Moreover, the entry corresponding to the CD-ROM (device 2) of FIG. 3D is not removed from the table, so that if a future system includes a CD-ROM, the boot sequence for the added CD-ROM will be the same as the CD-ROM of FIG. 2D.

Figure 4:
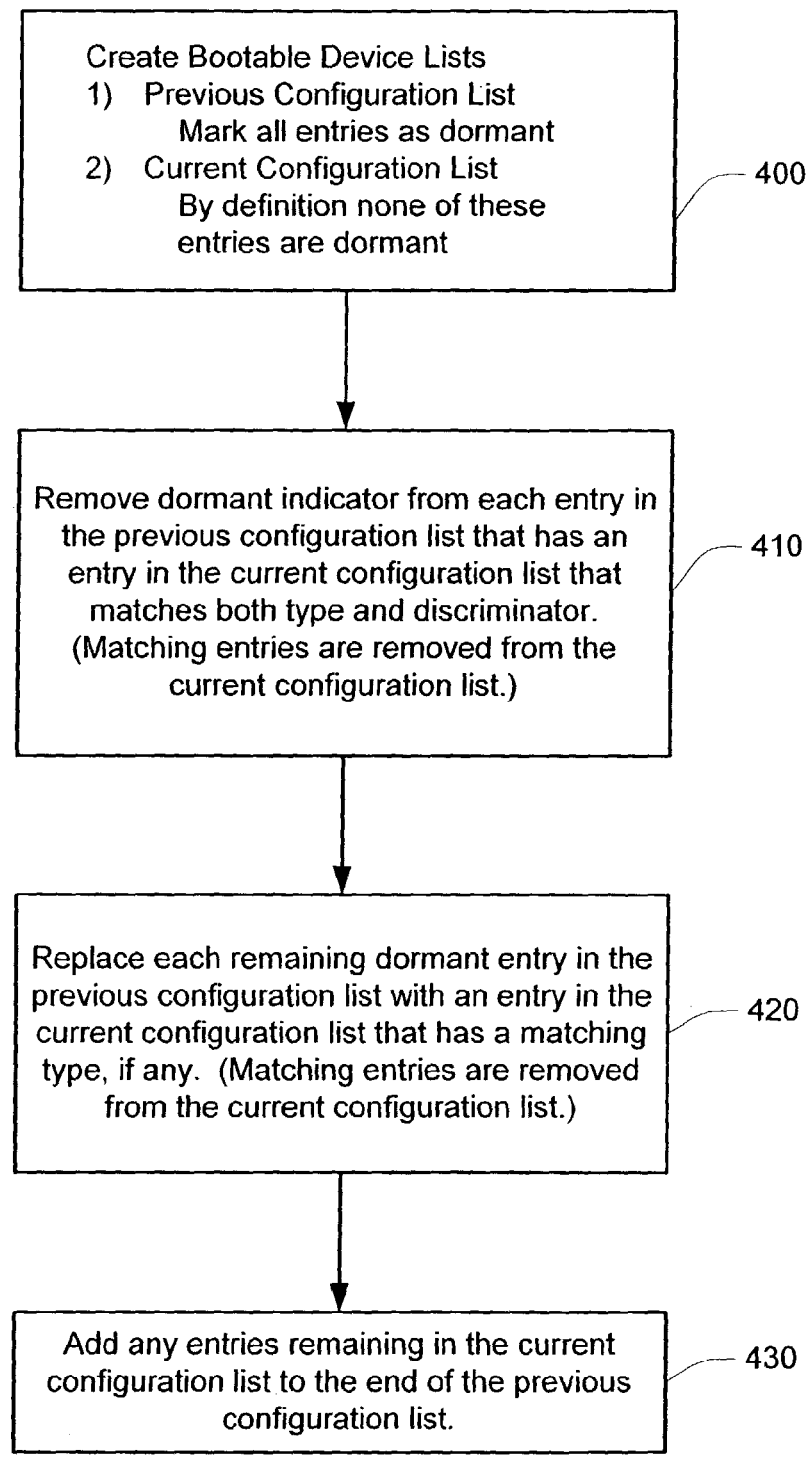
FIG. 4 is an example of a method for maintaining the boot sequence of bootable devices in an information handling system.

Another implementation of a method for maintaining the boot order of bootable devices is shown in FIG. 4. The method begins by creating two lists at block 400: a previous configuration list and a current configuration list. The entries in the previous configuration list are marked as dormant. In one example, no entry in the current configuration list is marked dormant. The method identifies elements in the current configuration list that have the same device type and discriminator (block 410). The dormant indicator is removed from each such element identified in the current configuration list (block 410). Matching entries are also removed from the current configuration list in block 410 of one example method.

Following the identification of devices with matching device type and discriminator, the method attempts to match a dormant entry in the previous configuration list with an entry in the current configuration list. In one example, the method replaces each remaining dormant entry in the previous configuration list with an entry in the current configuration list that has a matching type, if any (block 420). The matching entries, if any, are removed from the current configuration list in block 420. Additionally, any entries remaining in the current configuration list are added to the end of the previous configuration list (block 430).

This disclosure is not limited to computer systems, but may be applied to any information handling system. Although the present disclosure has been described in detail, it should be understood that various changes, substitutions, and alterations can be made hereto without departing from the spirit and the scope of the invention as defined by the appended claims.

What is claimed is:

1. A method for maintaining a boot sequence in an information handling system, the information handling system including one or more bootable devices and a memory for storing a previous configuration of the one or more bootable devices, the previous configuration including a first list of one or more elements, each element of the previous configuration including a device type and a device discriminator, wherein the device discriminator uniquely identifies the device among devices of the same type, the method comprising:
   receiving a current configuration for one or more bootable devices in an information handling system, the current configuration including a second list, each element of the second list including a device type and a device discriminator, wherein the device discriminator uniquely identifies the device among devices of the same type;
   comparing the previous configuration to the current configuration of one or more bootable devices; and
   updating the previous configuration.

2. The method for maintaining a boot sequence of claim 1, wherein updating the configuration history further comprises:
   marking all elements in the previous configuration list as dormant;
   for each element in the previous configuration list having a device type and device discriminator that match the device type and device discriminator of an element in the current configuration list:
   removing the dormant marker from the element in the previous configuration list; and
   removing the matching entry from the current configuration list; for each element in the previous configuration list having a dormant marker and having a device type that matches the device type of an element in the current configuration list:
   replacing the element in the previous configuration list with the element in the current configuration list; and
   removing the matching element from the current configuration list; and
   adding any elements remaining in the current configuration list to the previous configuration list.

3. The method of claim 1, wherein the memory is a nonvolatile storage component.

4. The method of claim 3, wherein the nonvolatile storage component is Flash ROM, EPROM, CMOS, or nonvolatile random access memory (NVRAM).

5. The method of claim 1, wherein one or more bootable devices is an Initial Program Load (IPL) device, a Plug and Play (PnP) device, or a BIOS Aware Initial Program Load Device (BAID).

6. The method of claim 1, wherein one or more bootable devices is associated with a Boot Connection Vector (BCV) or with a Bootstrap Entry Vector (BEV).

7. The method of claim 1, wherein:
   each element of the first list further includes an address associated with a bootable device; and
   each element of the second list further includes an address associated with a bootable device.

8. The method of claim 1, wherein the device discriminator is a serial number associated with the device.

9. The method of claim 1, wherein the device discriminator is a function of a memory address.

10. The method of claim 1, wherein the bootable device discriminator is a MAC address.

11. The method of claim 10, wherein the function is selected from the group consisting of:
   identifying the contents of the address,
   identifying a checksum of the address; and
   identifying a cyclic redundancy check (CRC) of the contents of the address.

12. The method of claim 1, wherein the device discriminator includes one or more parameters.

13. A method for maintaining a boot sequence in an information handling system, the information handling system including one or more bootable devices and a memory for storing a previous configuration of the one or more bootable devices, the previous configuration including a first list of one or more elements, each element of the previous configuration including a device type and a device discriminator, the device discriminator uniquely identifying a device having a device type, comprising:
   receiving a current configuration for one or more bootable devices in an information handling system, the current configuration including a second list, each element of the second list including a device type and a device discriminator, a device discriminator uniquely identifying a device having a device type;
   comparing the previous configuration to the current configuration of one or more bootable devices; and updating the previous configuration, comprising,
  marking all elements in the previous configuration list as dormant;
  for each element in the previous configuration list having a device type and device discriminator that match the device type and device discriminator of an element in the current configuration list:
    removing the dormant marker from the element in the previous configuration list; and
    removing the matching entry from the current configuration list;
  for each element in the previous configuration list having a dormant marker and having a device type that matches the device type of an element in the current configuration list:
    replacing the element in the previous configuration list with the element in the current configuration list; and
    removing the matching element from the current configuration list; and
  adding any elements remaining in the current configuration list to the previous configuration list.

14. The method of claim 13, wherein the memory is a nonvolatile storage component.

15. The method of claim 14, wherein the nonvolatile storage component is Flash ROM, EPROM, CMOS, or nonvolatile random access memory (NVRAM).

16. The method of claim 13, wherein one or more bootable devices is an Initial Program Load (IPL) device, a Plug and Play (PnP) device, or a BIOS Aware Initial Program Load Device (BAID).

17. The method of claim 13, wherein one or more bootable devices is associated with a Boot Connection Vector (BCV) or with a Bootstrap Entry Vector (BEV).

18. The method of claim 13, wherein:
  each element of the first list further includes an address associated with a bootable device; and
  each element of the second list further includes an address associated with a bootable device.

19. The method of claim 13, wherein the device discriminator is a serial number associated with the device.

20. The method of claim 13, wherein the device discriminator is a function of a memory address.

21. The method of claim 13, wherein the bootable device discriminator is a MAC address.

22. The method of claim 21, wherein the function is selected from the group consisting of
  identifying the contents of the address,
  identifying a checksum of the address; and
  identifying a cyclic redundancy check (CRC) of the contents of the address.

23. The method of claim 20, wherein the device discriminator includes one or more parameters.

* * * * *